United States Patent
Herrmann et al.

(10) Patent No.: US 6,399,031 B1
(45) Date of Patent: Jun. 4, 2002

(54) CONTINUOUS FLOW REACTOR HAVING A PLURALITY OF ALTERNATING BENDS

(75) Inventors: Christof Herrmann, Viernheim; Wolfgang Hübinger, Limburgerhof; Jens Kremeskötter, Ludwigshafen; Roland Minges, Grünstadt; Jürgen Schmidt-Thümmes, Neuhofen; Hans-Ulrich Moritz, Bendestorf; Wolfgang Schmidt, Paderborn; Maren Ridder, Hamburg, all of (DE)

(73) Assignee: BASF Aktiengesellschaft, Ludwigshafen (DE)

(*) Notice: Subject to any disclaimer, the term of this patent is extended or adjusted under 35 U.S.C. 154(b) by 0 days.

(21) Appl. No.: 09/147,725

(22) PCT Filed: Aug. 26, 1997

(86) PCT No.: PCT/EP97/04654
§ 371 (c)(1),
(2), (4) Date: Feb. 24, 1999

(87) PCT Pub. No.: WO98/08602
PCT Pub. Date: Mar. 5, 1998

(30) Foreign Application Priority Data

Aug. 26, 1996 (DE) .......................... 196 34 450

(51) Int. Cl.$^7$ .......................... B01J 19/00; C02F 2/00; F28D 21/00

(52) U.S. Cl. .................. 422/197; 422/132; 422/198; 422/200; 422/201; 165/177; 165/184; 366/336; 366/339; 526/64

(58) Field of Search ................... 422/224, 132, 422/196, 197, 198, 200, 201; 165/150, 184, 163, 177; 366/341, 339, 336; 526/64

(56) References Cited

U.S. PATENT DOCUMENTS

| 2,161,481 | A | | 6/1939 | Marks |
| 3,024,280 | A | * | 3/1962 | Braun |
| 4,122,136 | A | | 10/1978 | Korte et al. |
| 4,713,434 | A | | 12/1987 | Sutterlin et al. |
| 5,133,941 | A | * | 7/1992 | Hays et al. ................. 422/140 |
| 5,159,976 | A | * | 11/1992 | Virtue ........................ 165/144 |
| 5,453,470 | A | | 9/1995 | Kasai et al. |
| 5,603,894 | A | * | 2/1997 | Aikus et al. ................... 422/23 |
| 5,779,994 | A | * | 7/1998 | Kupper et al. .............. 422/197 |

FOREIGN PATENT DOCUMENTS

| CZ | 151220 | 12/1973 |
| DE | 880 938 | 6/1953 |
| DE | 10 71 341 | 8/1961 |
| DE | 23 42 788 | 3/1974 |
| DE | 26 17 570 | 11/1977 |
| DE | 33 02 251 | 7/1984 |
| DE | 33 06 249 | 8/1984 |
| DE | 233572 | 3/1986 |
| DE | 233573 | 3/1986 |
| DE | 234163 | 3/1986 |
| DE | 238163 | 8/1986 |

(List continued on next page.)

OTHER PUBLICATIONS

M.Darton and J. Clark, The Macmillan Dictionary of Measurement, MacMillan Publishing Company, pp. 106, 354, and 376 (1994).
D. Thoenes, Chemical Reactor Development from Laboratory Synthesis to Industrial Production, Kluwer Academic Publishers, pp. 34–37 (1994).

(List continued on next page.)

Primary Examiner—Hien Tran
(74) Attorney, Agent, or Firm—Oblon, Spivak, McClelland, Maier & Neustadt, P.C.

(57) ABSTRACT

A curved tubular flow reactor designed for carrying out chemical reactions continuously, for preparing mixtures and as a liquid-phase heat exchanger comprises a plurality of successive bends having alternating directions of curvature.

37 Claims, 10 Drawing Sheets

FOREIGN PATENT DOCUMENTS

| | | |
|---|---|---|
| EP | 041 204 | 12/1981 |
| EP | 117492 | 9/1984 |
| EP | 336 469 | 10/1989 |
| EP | 633 061 | 1/1995 |
| FR | 847151 | 10/1939 |
| FR | 2698559 | 6/1994 |
| GB | 517951 | 2/1940 |
| GB | 875796 | 8/1961 |
| GB | 1 432 147 | 4/1976 |
| WO | WO 94/12270 | 6/1994 |
| WO | WO 99/04892 | 2/1999 |
| WO | WO 99/44737 | 9/1999 |
| WO | WO 99/45033 | 9/2000 |

OTHER PUBLICATIONS

A.K. Saxena, et al., AIChE Journal. vol. 30, No. 3, pp. 363–368, "Coiled Configuration For Flow Inversion And Its Effect On Residence Time Distribution", May 1984.

A.L. Rollin, et al., ACS Symp. Ser., vol. 104, pp. 113–136, "Continuous–Emulsion Polymerization Of Styrene In A Tubular Reactor".

D.A. Paquet, Jr., et al. AIChe Journal, vol. 40, No. 1, pp. 73–87, "Tubular Reactor For Emulsion Polymerization: I. Experimental Investigation", Jan. 1994.

G. T. Zhang, et al., The Chemical Engineering Journal, vol. 45, pp. 43–48, "How to Narrow The Residence Time Distribution Of Fluids In Laminar Flow In Pipes", 1990.

J. Meuldijk et al., Chemical Engineering Science, vol. 47, No. 9–11, pp. 2603–2608, "A Novel Reactor For continuous Emulsion Polymerisation", 1992.

H.C. Lee et al., Chemical Engineering Science, vol. 41, No. 4, pp. 1023–1030, "Continuous Tube–CSTR Reactor System For Emulsion Polymerization Kinetic Studies", 1986.

L.C. Truesdell, Jr., et al. AIChE Journal, vol. 16, No. 6, pp. 1010–1015, "Numerical Treatment Of Fully Developed Laminar Flow In Helically Coiled Tubes", Nov. 1970.

P. Bataille, et al., Journal of Applied Polymer Science, vol. 38, pp. 2237–2244, "Loop Polymerization of Vinyl Acetate", 1989.

A.A.J. Feast, Reports on the Progress of Applied Chemistry, vol. 56, pp. 45–54, "Continuous Emulsion Polymirisation", 1972.

Kunio Kataoka, et al., Chemical Engineering Science, vol. 50, No. 9, pp. 1409–14016, "Emulsion Polymerization of Styrene In A Continuous Taylor Vortex Flow Reactor", 1995.

Tsuyoshi Imamura, et al., Polymer International, vol. 30, No. 2, pp. 203–206, "A New Approach To continuous Emulsion Polymerization", 1993.

Wiley & Sons, Encyclopedia of Polymer Science and Engineering, vol. 6, pp. 11–19, "Emulsion Polymerization", 1986.

Carlos Abad, et al., Journal of Applied Polymer Science, vol. 56, pp. 419–424, "Emulsion Copolymerization Of Vinyl Esters In Continuous Reactors: Comparison Between Loop and Continuous Stirred Tank Reactors", 1995.

D.A. Paquet, Jr., et al., AIChE Journal, vol. 40, No. 1, pp. 88–96, "Tubular Reactors For Emulsion Polymerization: II. Model Comparisons With Experiments", Jan. 1994.

Walter Mueller, Chemie Ingenieur Technik, vol. 54, No. 6, pp. 610–611, "Ein Neuer Rohrreaktor Fuer Hochzaehe Medien. Versuchsergebnisse Und Vergleichende Betrachtung Mit Statische Mischern", Jun. 1982.

* cited by examiner

CONTINUOUS FLOW REACTOR HAVING A PLURALITY OF ALTERNATING BENDS

BACKGROUND OF THE INVENTION

1. Field of the Invention

The present invention relates to a curved, tubular flow reactor having an essentially circular or elliptical cross section, to the use of this apparatus for carrying out chemical reactions continuously and to a process for continuous polymerization using the novel apparatus.

2. Description of the Background

When chemical reactions are carried out on an industrial scale, continuous-reaction engineering often provides advantages over reactions being run discontinuously. This is particularly true in those cases where large volumes have to be coped with and discontinuous-reaction engineering is likely to result in uneven product quality from batch to batch. However, it is often difficult for continuous-reaction engineering to be put into practice. One of the fields to which this is applied is emulsion polymerization and suspension polymerization of ethylenically unsaturated monomers.

There has been no lack of attempts at the practical implementation of continuous-reaction engineering in this field. The first patents on continuous emulsion polymerization were filed as early as 1937 and 1938 by I. G. Farbenindustrie (GB 517,951 and FR 847,151). By now numerous approaches to continuous emulsion polymerization are known. Described most frequently is the use of a continuous stirred-tank reactor, an overview being provided, for example, by Encyclopedia of Polymer Science and Engineering, 1986, Vol. 6, pp. 11 to 18. Emulsion polymerization in such reactors results in a wide particle size distribution, and the establishment of a steady state takes a relatively long time or fails altogether. Moreover, owing to the shear-force action of the stirrer, there is an increased tendency for the polymer to coagulate and then all too readily to settle on the stirrer or on reactor internals.

A particular refinement of the abovementioned stirred reactors is described in DE-A-1,071,341. The reactor, a cylindrical tube, is equipped with disks seated on a shaft, which result in Taylor rings being formed when the stirrer is set in rotation. The main effect of this is to improve mixing perpendicular to the flow direction, thereby improving the space-time yield. Reactors of this type always comprise moving parts. This has the drawback that constructional measures are required for supporting and sealing the shaft. Moreover, accretions and deposits of polymer are formed owing to gas bubbles present or being formed in the system, which collect preferentially at the shaft and in low-flow zones and there trigger coagulation of the polymer. Finally, the rotating disks give rise to shear forces which likewise lead to coagulation of the polymer.

A further improvement is represented by reactors which comprise two concentric cylinders, the inner and/or outer cylinder being set in rotation. Depending on the speed of rotation and the flow velocity, various stable flow patterns are formed which can cover a range with laminar Couette low at one end, the formation of Taylor ring vortices in between, up to turbulent vortex flow. Polymer International 30 (1993), 203–206 describes a continuous Couette-Taylor vortex reactor and its use for continuous emulsion polymerization) resulting in latex particles having a relatively narrow particle size distribution. Chemical Engineering Science, Volume 50, pp. 1409–1416 (1995) describes the emulsion polymerization of styrene in a continuous Taylor vortex-flow reactor. Since reactors of this type do not employ a conventional agitator, they are particularly suitable for preparing polymer dispersions which have a particularly pronounced tendency to coagulate under the influence of shear forces. Moreover, similar drawbacks arise as in the reactor described in DE-A-1 071 341.

An alternative to the stirred reactors is the use of pulsed, packed columns as described in Chem. Eng. Sci. Vol. 47, 2603–2608 (1992) and EP-A-336 469. It is thus possible for styrene or vinyl acetate to be polymerized continuously. However, columns of this type will very readily foul and plug.

A further alternative to the stirred-tank reactors and stirred tubular reactors mentioned are, in general, simple "empty" tubular reactors, i.e tubular reactors without additional internals such as a static mixer or a stirrer. Owing to the large specific surface area of a tube they are particularly advantageous with strongly exothermal polymerizations. Thus, for example, continuous suspension polymerization is described in DE-A-2342788 and DE-A-880938. There are also numerous studies which address emulsion polymerization in a tubular reactor, whether it be with laminar or with turbulent flow. An overview of this work is found in Reactors, Kinetics and Catalysis, AIChE Journal, 1994, Vol. 40, 73–87.

One of the main problems in carrying out an emulsion polymerization in a tubular reactor is that of the tubes being plugged by coagulate, which is a particular problem in the turbulent flow domain. Attempts have therefore been made, by additional measures and special reaction engineering, to prevent coagulate formation, for example with the aid of pulsed tubular reactors, see the last-mentioned publication, or by optimizing the reactor dimensions and the material for the tubes, see ACS Symp. Ser. 104, 113 (1979). Patent publications which describe tubular reactors for emulsion polymerization are DE-A-26 17 570, DD-A-238 163, DD-A-234 163, DD-A-233 573, DD-A-233 572, DE-A-33 02 251 and CZ-A-151 220. FR-A-842 829 and EP-A-633 061 disclose a continuous-polymerization tubular reactor, in which curved tube segments are linked by means of long straight tube segments. Reactors of this type result in a broad residence time distribution of the unit volumes.

Tubular reactors in most cases are employed in the form of helically wound reactors, see the two last-mentioned publications. The flow conditions in wound tubular reactors have been particularly well studied. The centrifugal forces arising in helically wound tube produce a secondary flow perpendicular to the principal flow direction. Said secondary flow was first described by Dean and is therefore known as a Dean vortex. The Dean vortices in a helically wound tube favor a narrow residence time distribution of the unit volumes and, in the case of laminar flow, result in higher heat transfer coefficients and mass transfer coefficients, compared with a straight tube with corresponding laminar flow. A further improvement is achieved by an abrupt change in direction of the centrifugal forces, see Saxena in AIChE Journal Vol. 30, 1984, pp. 363–368 (also compare FIGS. 13 and 14). The change in direction is effected by a 90° kink in the helical winding. By means of a total of 57 kinks, Saxena et al were able to achieve the narrowest known residence time distribution in an apparatus with laminar flow. As a result of the laminar flow, the reaction volume is kept small and only low shear forces arise. Even with laminar flow, a high heat transfer coefficient is achieved here.

Notwithstanding all the studies and insights with respect to reaction engineering in connection with disperse systems in tubular reactors, these have not so far been able to find general acceptance in practice. The reason for this is that, on the one hand, the plugging problem in tubular reactors has not yet been solved satisfactorily and that, on the other hand, the model described by Saxena et al, having kinked helical windings, has decisive drawbacks in practice, such as the difficult fabrication, bulkiness, and the fact that descending turns involving descending flow are present, which may have an adverse effect on productivity. In particular, the formation of gas bubbles of monomers or air can be observed, which results in greater coagulate formation and disruptions of the progress of the polymerization, and in uneven flow and a change in the residence time of the liquid phase. Additionally there is the risk that those fractions of the reaction mixture which have a higher specific gravity, e.g. the particles present in the dispersion, will settle to a greater extent in the descending turns.

SUMMARY OF THE INVENTION

It is therefore an object of the present invention to provide an apparatus and a process for carrying out liquid-phase chemical reactions, especially polymerizations, continuously, which have been improved with respect to the prior art and permit the reactions to be carried out in a simple manner.

We have found, surprisingly, that this object is achieved if a tubular reactor having a plurality of successive bends having alternating directions of curvature is employed.

DETAILED DESCRIPTION OF THE PREFERRED EMBODIMENTS

The present invention therefore relates to a curved tubular flow reactor having an essentially circular or elliptical cross section, which comprises a plurality of preferably directly successive bends having alternating directions of curvature, a change in the direction of curvature taking place at the latest when the distance which the center of gravity of the cross-sectional area of the tube has traversed from the start of a bend is 200 times the diameter of the tube, it being possible for the bend to comprise up to three circumvolutions around the axis of curvature.

The term tube diameter in the case of an elliptical cross section of the reactor refers to the average of the major and the minor axis.

Bends having alternating directions of curvature in this context mean a succession of curved tube segments, each particular next tube segment (section of the tube between two successive reversals of curvature, e.g. the sections between two axis intersections in FIGS. 1 to 4) pointing in a different direction, preferably the opposite direction to the previous one, i.e. a change takes place with each curved tube segment, preferably a reversal of the direction of curvature. What is achieved by this design of the reactor is as uniform a flow as possible, resulting in the residence time distribution of the unit volumes being narrowed down. Moreover, the design of the reactor permits the fabrication of windings having a spatially particularly favorable, i.e. compact, arrangement, so that they are particularly suitable for industrial practice (more detailed discussions of the structures resulting therefrom will follow below). The reactor according to the invention allows a high Bodenstein number to be achieved, which is generally $\geq 10$ and preferably $\geq 100$ and may be up to 1000 and more. It is a measure of the spread of the residence time distribution; the higher it is, the narrower and more symmetric is the residence time distribution.

Preferably, the reversal of the direction of curvature takes place at the latest when the distance which the center of gravity of the cross-sectional area of the tube has traversed from the start of a bend is 150 times, in particular 100 times, preferably 80 times, particularly preferably 50 times, 30 times or 25 times the diameter of the tube. This distance generally is at least 5 times the tube diameter, and in particular it is in the range of from 10 to 150 times, in particular from 10 to 100 times, preferably from 10 to 80 times and particularly preferably from 10 to 50 times, 10 to 40 times or 10 to 30 times the diameter of the tube.

A bend may comprise not only a partial circumvolution, but also one and up to two or three circumvolutions around the axis of curvature (axis through the intersection of $R_1$ and $R_2$, see FIGS. 1 to 4). The angle swept by the normal vector of the principal flow direction of a bend until the direction of curvature changes is therefore generally $\leq 1080°$, preferably $\leq 720°$ and particularly preferably $\leq 360°$.

The bends are preferably essentially sinusoidal. Sinusoidal bends in the present case are to be understood as any type of preferably periodically repeating bends essentially in one plane. Examples of these are the bends shown in FIGS. 1 to 4. Evidently, the ratio $R_1/R_2$, i.e. the ratio of amplitude to period/4, can be within a wide range. Preferably, however, it is in the range of from 5:1 to 1:50, in particular from 3:1 to 1:5 and particuarly preferably it is 1:1.

It is evident, moreover, that not only those bends should be covered in which the angle formed between the axis and the tangent in the point of inflection differs from 90°, but also those in which said angle is 90°, i.e. butted semicircular tube segments, which are particularly preferred.

The radius of curvature of the curved tube segments is preferably from 0.5 to 100 times, preferably from 1 to 80 times, from 2 to 50 or from 2 to 20 times the diameter of the cross-sectional area of the tube.

The dimensions of the reactor are generally such that the ratio of length to diameter is in the range from 100:1 to 1,000,000:1, preferably from 1,000:1 to 100,000.1 or 50,000:1.

Where appropriate, one or more of the curved tube segments may be linked by straight tube segments. The ratio of straight to curved section of tube is then $\leq 5$, preferably $\leq 2$, especially $\leq 1$ and particularly preferably $\leq 0.5$ or $\leq 0.25$.

The apparatus may also be composed from a plurality of reactor units, with the option of the reactor, in each unit, having different geometries and/or dimensions and/or radii of curvature. For example, in one unit the tube diameter may be increased to achieve a lower flow velocity, or the radius of curvature may be varied so as to establish special product properties.

The cross section of the reactor is preferably circular or elliptical. This also includes modified circular or elliptical cross sections, i.e. cross sections which result from the corners of a square or a rectangle being rounded off. In the case of swirl promoter tubes (see below) the basic shape of the reactor tube is essentially circular or elliptical.

If the cross section is elliptical, the ratio of the semimajor axis to the semiminor axis is generally in the range of from 5:1 to 1:1, especially in the range of from 2:1 to 1:1.

According to a preferred embodiment, the apparatus is constructed as an ascending, as seen from the direction of the incoming flow, and single-layer winding around at least two arbors. The arbors may form an angle with respect to one another, but are preferably essentially parallel. In the case of a non-self-supporting winding, these arbors may preferably be implemented by means of pipes or rods which may be round or angular. The term "winding around at least two arbors" is used herein only for illustrative purposes. It is not necessary for the arbors actually to be implemented in the application, e.g. in the form of pipes or rods. In the case of a winding around 2 parallel arbors the result is e.g. the arrangement shown in FIGS. 5, 6 and 9.

If a winding is produced around a plurality of arbors, which are preferably arranged in a plane, this results in a ribbon-like or wall-like design, as shown in FIGS. 7 and 8.

Finally it is also possible to produce a winding around a plurality of essentially parallel arbors which pass through the corners of a polygon, especially an equilateral polygon and run perpendicular to the plane thereof. The polygon may have an even and preferably an odd number of corners, specifically at least 3 or 5. A heptagon has been found to be particularly advantageous (see FIGS. 10 and 11). A polygonal winding can be understood as bends along angled arbors (perpendicular to the abovementioned preferably parallel arbors, which have been combined into a polygon.

The external spacing of the arbors around which the winding is run may be varied over a wide range. In general it is from 1 to 10 times, preferably from 1 to 5 times and especially from 1 to 3 times the diameter of the reactor tube, the single to double distance being particularly preferred.

Additionally, the winding is also defined by the pitch. This in general is from 1 to 10 times, especially from 1 to 3 times the diameter of the reactor (in the case of the cross section being circular) or of the arbor pointing in the direction of the pitch if the cross section is elliptical.

The abovementioned windings are a particularly favorable arrangement, in spatial terms, and permit compact construction of the apparatus according to the invention. They can easily be moved, which proves particularly advantageous during maintenance. The number of the windings arranged above one another can be chosen at will, it depends on the requirements in each particular case.

The curved reactor may be made, depending on the requirements of the reaction to be carried out, from metal, a metal alloy, glass or a plastic. There are no restrictions whatsoever in this respect, the tube need only be resistant to the reactants and be stable under the reaction conditions. If the reactor consists of metal, it may be made, for example, from copper or copper alloys, steel or alloy steel of any type.

If the reactor is made of a plastic, preference is given to fluorine-containing plastics, e.g. tetrafluoroethylene, and to polyethylene, polypropylene or poly(vinyl chloride).

The reactor may be made of special section tubes, especially swirl promoter tubes or fluted tubes or have an internal coating. Depending on the requirements of the reaction to be carried out, this coating is chosen to be acid-resistant, alkali-resistant or solvent-resistant, etc. Examples of internal coatings are, in particular, fluorine-containing plastics such as tetrafluoroethylene, polyethylene or polypropylene. Additionally, the interior of the tube may have been rendered inert by chemical treatment, e.g. passivated by treatment with nitric acid, have been electropolished or mechanically polished.

The reactor according to the invention may, if required, comprise ancillary devices or be combined with other equipment. Expediently, means may be provided, at one or more points along the curved reactor, for feeding in chemicals, for example catalysts, reagents, solvents etc., and/or for cleaning, e.g. by making use of pigging systems.

Additionally, the reactor may comprise pulsation means, e.g. pumps, so as to cause the reaction to proceed in a pulsed manner. Moreover, at the start or at any point along the curved tube a device may be provided by means of which, e.g. for separation purposes, gas bubbles of an inert gas such as nitrogen and/or pigs may be introduced. It is further possible for subsegments of the curved reactor, which as a rule do not exceed 10% of the reactor length, to be provided with conventional mixing elements, for example packings, static or dynamic mixers.

In general, provision is also made for measuring points and sampling devices along the curved reactor.

The reactor generally also comprises means for heating or cooling the medium flowing through. Suitable for this purpose may be a heatable or coolable container, which may or may not be subdivided into zones and totally or partially encloses the tubular reactor so as to control the temperature in the desired manner. It is also possible to have the heating or cooling medium flow through the pipes around which the tubular reactor is wound. The reactor may also be equipped with a jacket heating or cooling system.

Finally, the reactor may be combined in any which way with other apparatuses which may be connected upstream and/or in parallel and/or downstream.

The novel reactor can be used for carrying out chemical reactions continuously in the liquid phase. Examples of such chemical reactions are polymerizations, depolymerizations, oxidation and reduction reactions etc. The reactor is also suitable for the continuous preparation of mixtures for the systems solid/liquid, liquid/liquid and liquid/gaseous. A relevant example is the mixing of liquids upstream of spray heads. The reactor can further be used as a heat exchanger for liquids and gas.

The temperature at which the reactor can be operated is limited only by the materials used.

The reactor is particularly suitable, however, for continuous polymerization. The present invention therefore also relates to a continuous polymerization process making use of the novel reactor. Polymerization in this context relates to free-radical, ionic (anionic and cationic) and thermal polymerization of ethylenically unsaturated monomers including living polymerization, as well as to polycondensation and polyaddition. It can be carried out in homogeneous or heterogeneous phase under any of the conditions resulting in polymerization. Examples of polycondensation and polyaddition are the preparation of polyester and polyurethane. The reactor is preferably suitable for free-radical polymerization. This includes solution polymerization, precipitation polymerization, bulk polymerization and preferably suspension polymerization and emulsion polymerization, including mini-, micro- and inverse emulsion polymerization.

How to carry out polymerizations is known, in principle, to those skilled in the art. More detailed information on this subject can be found, for example, in Houben-Weyl, Volume XIV, makromolekulare Stoffe, Georg Thieme Verlag, Stuttgart, 1961.

For polymerization purposes it proved particularly expedient to employ a flow characterized by a Reynolds number of 1–10,000, preferably 10–1000, frequently 20–100. The reaction temperature generally is in the range of from 5 to 250° C., in particular from 5 to 150° C., preferably from 30 to 150° C. and particularly preferably from 50 to 100° C. The polymerization can be carried out at standard pressure or under pressure. Additionally, a reduced pressure can be set at the end of the tube.

For the purpose of the novel process, use can be made of any ethylenically unsaturated monomers which can be polymerized under the conditions of free-radical polymerization.

The components required for the polymerization can be fed in at the start of the reactor or along the reactor, as required. When a copolymer is being prepared, for example, the infeed of the comonomer(s) together with the main monomer, or of other components, is possible at the start of or along the curved reactor at various points.

Monomers suitable for the process according to the invention are $C_2$–$C_6$-mono- and -diolefins, $C_3$–$C_6$-monoethylenically unsaturated mono- or dicarboxylic acids, their salts or mono- or diesters thereof with $C_1$–$C_{18}$-alkanols or -diols or amides and N-mono- or N,N-di-$C_1$–$C_{18}$-alkylamides or -hydroxyalkylamides thereof, (meth) acrylonitrile, monoethylenically unsaturated sulfonic acids and/or their salts, vinylaromatic compounds, vinyl-$C_1$–$C_{18}$-alkylethers, vinyl-$C_1$–$C_{18}$-alkylesters, N-vinyllactams or vinyl halides and mixtures of various monomers of one type and/or different types.

Examples of suitable monomers are ethylene, propylene, butadiene, acrylic acid, methacrylic acid, maleic acid, fumaric acid, itaconic acid, esters of acrylic acid or methacrylic acid with methanol, ethanol, n-propanol, isopropanol, n-butanol, isobutanol, sec-butanol, t-butanol, pentanol, hexanol, 2-ethylhexanol, octanol, decanol, dodecanol or stearyl alcohol, acrylamide, methacrylamide, acrylonitrile, methacrylonitrile, styrene, α-methylstyrene, vinyl ethyl ether, vinyl acetate, vinyl propionate, N-vinylpyrrolidone, vinyl chloride, vinylidene chloride, α-phenylstyrene, vinylpyridine, the sodium salt of vinylsulfonic acid, acrylamidopropanesulfonic acid or their alkali metal salts or the sodium salt of sulfonated styrene.

If desired, cross-linking agents can be employed such as the abovementioned mono- or diesters of a $C_3$–$C_6$-monoethylenically unsaturated mono- or dicarboxylic acid with a $C_1$–$C_{18}$-alkanol or -diol or N-mono- or N,N-di-$C_1$–$C_{18}$-alkylamide, divinylbenzene, silicon-containing cross-linking agent and the like.

To control the molecular weight, conventional regulators can be employed, for example mercapto compounds such as mercaptoethanol, mercaptopropanol, mercaptobutanol, mercaptoacetic acid, mercaptopropionic acid, mercaptotrimethoxysilane, butylmercaptan and t-dodecylmercaptan. Also suitable are organic halogen compounds such as carbon tetrachloride or bromotrichloromethane. The amount of regulator is generally in the range of from 0.01 to 5 wt %, based on the monomers to be polymerized.

All those free-radical polymerization initiators are potentially suitable which are able to initiate free-radical polymerization. These may be either peroxides, for example alkali metal peroxodisulfates or azo compounds. Combined systems can likewise be used, which are composed of at least one organic or inorganic reductant and at least one organic or inorganic oxidant, preferably a peroxide and/or hydroperoxide. The amount of initiators is generally from 0.01 to 5 wt %, in particular from 0.1 to 2 wt %, based on the total amount of the monomers to be polymerized.

The suspension or emulsion polymerization is carried out in the presence of suitable emulsifiers and protective colloids. These substances are normally used in amounts up to 10 wt %, preferably from 0.5 to 5 wt % and in particular from 0.5 to 3 wt %, based on the monomers to be polymerized.

Examples of suitable protective colloids are poly(vinyl alcohol)s, cellulose derivatives or copolymers based on vinylpyrrolidone. Suitable emulsifiers are, in particular, anionic and nonionic emulsifiers such as ethoxylated mono-, di- and trialkylphenols, ethoxylates of long-chain alkanols, alkali metal salts and ammonium salts of alkyl sulfates, of sulfuric acid hemiesters of ethoxylated alkanols and ethoxylated alkylphenols, of alkylsulfonic acids and of alkylarylsulfonic acids. A detailed description of protective colloids and emulsifiers is found in Houben-Weyl, Methoden der Organischen Chemie, Volume XIV/1, Makromolekulare Stoffe, Georg-Thieme Verlag, Stuttgart, 1961, pp. 192–208 and 411 to 420.

As a rule, the polymerization is carried out by the continuous phase first being introduced as the initial charge, i.e. the reactor is charged with the continuous phase. Then an emulsion of the monomer (or monomers) in the continuous phase is metered in. The initiator can be metered in separately or be metered into the emulsion just before the reactor.

The polymerization can also be carried out with the use of a seed latex which can be prepared separately or in the first section of the reactor. In the latter case, the monomers to be polymerized are then fed in after the seeds have formed.

If desired, a physical or chemical after treatment of the polymer dispersion can be carried out after it leaves the reactor or while still in the reactor, under customary conditions. This may serve e.g. for removing or reducing not completely polymerized monomer fractions and/or by-products of the polymerization or impurities of the starting materials. Also conceivable is the setting of a desired pH by the addition of a suitable neutralizing agent, and the addition of conventional additives such as antioxidants, biocides, cross-linking agents, colorants and the like.

The process according to the invention is suitable for preparing polymer dispersions comprising a wide polymer mass fraction. Preferably the polymer mass fraction is in the range from 25 to 75, in particular from 50 to 75 vol %. The viscosity of the polymer dispersions can likewise vary over a wide range. In general it is less than 800 mPa.s and preferably less than 500 mPa.s (determined in accordance with DIN 53019). The novel process is particularly suitable for preparing polymer dispersions which, as the main component, comprise acrylates and/or styrene, in particular those which comprise from 50 to 100 wt % of esters of acrylic or methacrylic acid with $C_1$–$C_{12}$-alkanols or from 50 to 100 wt % of styrene with or without copolymerized butadiene.

BRIEF DESCRIPTION OF THE DRAWINGS

The following examples illustrate the invention without limiting it. In the figures:

FIGS. 1 to 4 show, by way of example, various options for sinusoidal bends suitable for the curved reactor. It can be seen that the ratio of $R_1$ to $R_2$ (amplitude to period/4) can vary over a wide range.

FIG. 5 shows a reactor according to the invention in the simplest embodiment as a winding. The reactor comprises two rods 1 which are parallel to one another. A tube is wound around these rods so as to result in a curved reactor 2 having alternating directions of curvature. This can be clearly seen from FIG. 6, i.e. FIG. 6 shows a winding in the form of a prone figure of eight. The distance between the two rods 1 is about 1.5 times the diameter of the reactor 2. The reactor has an inlet 3 and an outlet 4, i.e. the medium in the reactor 2 flows in an upward direction.

FIG. 7 shows a further embodiment of a reactor according to the invention. It comprises 6 rods 1 around which a tube 2 having an inlet 3 and an outlet 4 is wound so as to produce an interweave around the rods 1, resulting in a reactor in the form of a palisade wall. FIG. 8 shows that the winding essentially corresponds to the curvature profile shown in FIG. 1.

FIG. 9 shows an alternative embodiment of a winding around two rods 1. The winding runs in such a way that the radius of curvature of a bend sweeps about 600°.

A further embodiment of the novel reactor can be seen in FIG. 10, in the form of a partial side view. FIG. 11 shows a single winding loop around seven rods 1 which are located at the corners of an equilateral heptangle. The rods 1 are wound continuously with a tube 2 so as to produce a basket-like winding. The flow direction is indicated by arrows. This apparatus is distinguished by a compact arrangement and is therefore particularly suitable for industrial applications.

Figure 1:
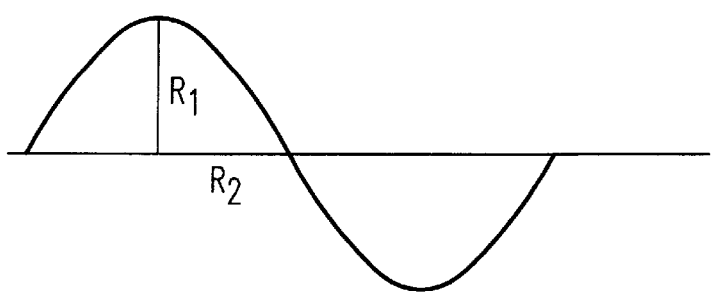
FIGS. 1 to 4 show a schematic representation of sinusoidal bends.
Figure 2:
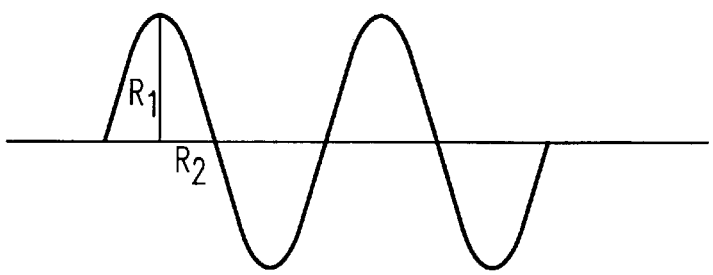
Figure 3:
Figure 4:
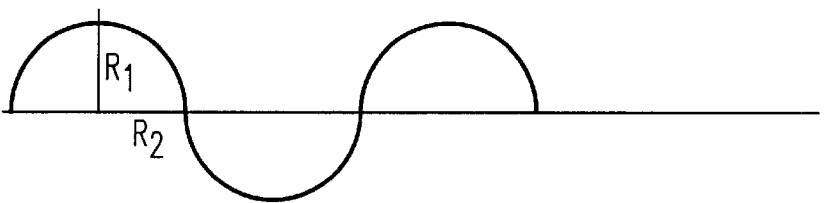
Figure 5:
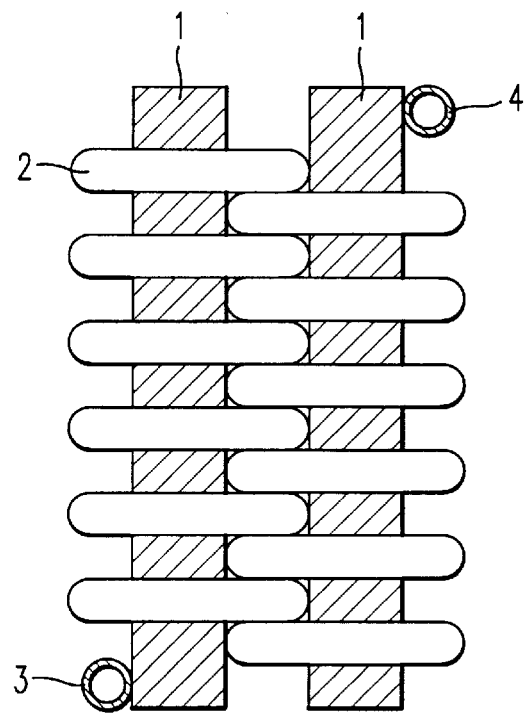
FIG. 5 shows the side view of a reactor according to the invention in the form of a winding around two rods
Figure 6:
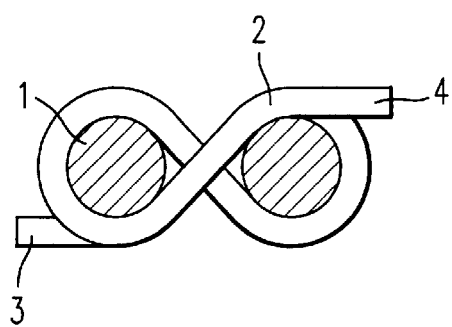
FIG. 6 shows a plan view from above of the reactor according to FIG. 5
Figure 7:
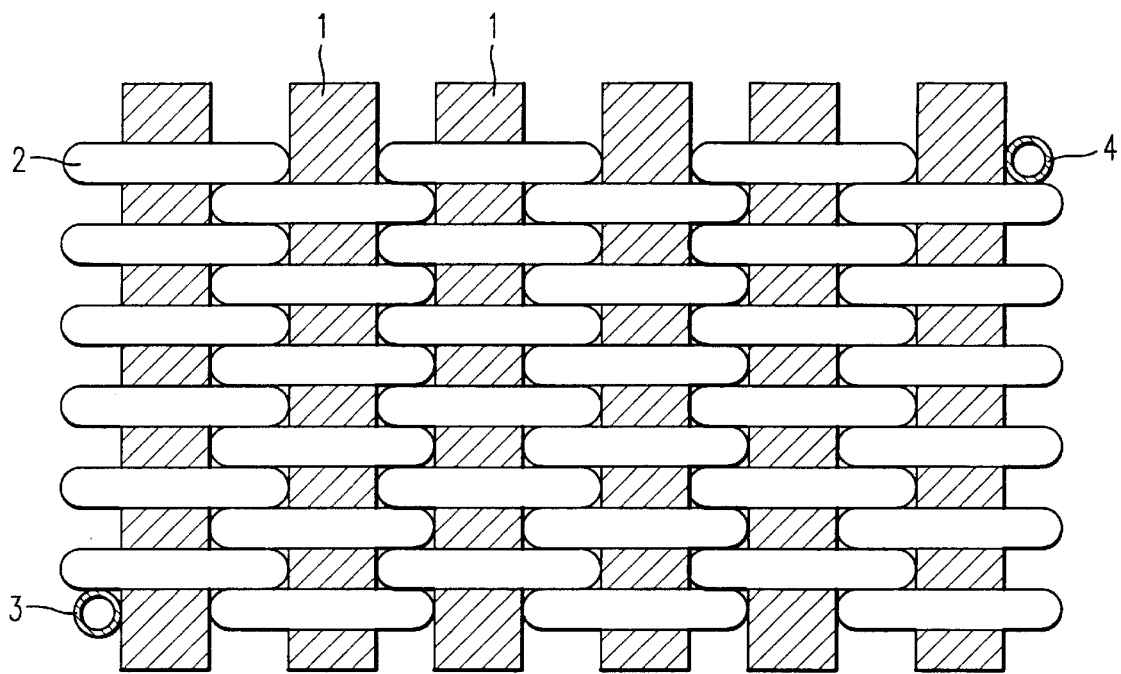
FIG. 7 shows a reactor according to the invention in the form of a winding around six rods arranged in a plane
Figure 8:
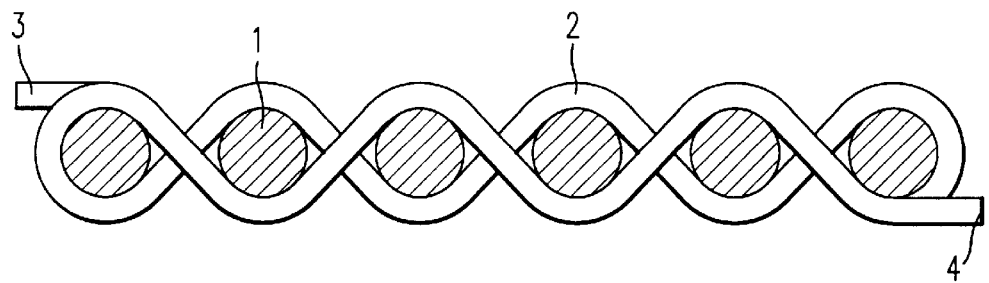
FIG. 8 shows a plan view from above of the reactor according to FIG. 7
Figure 9:
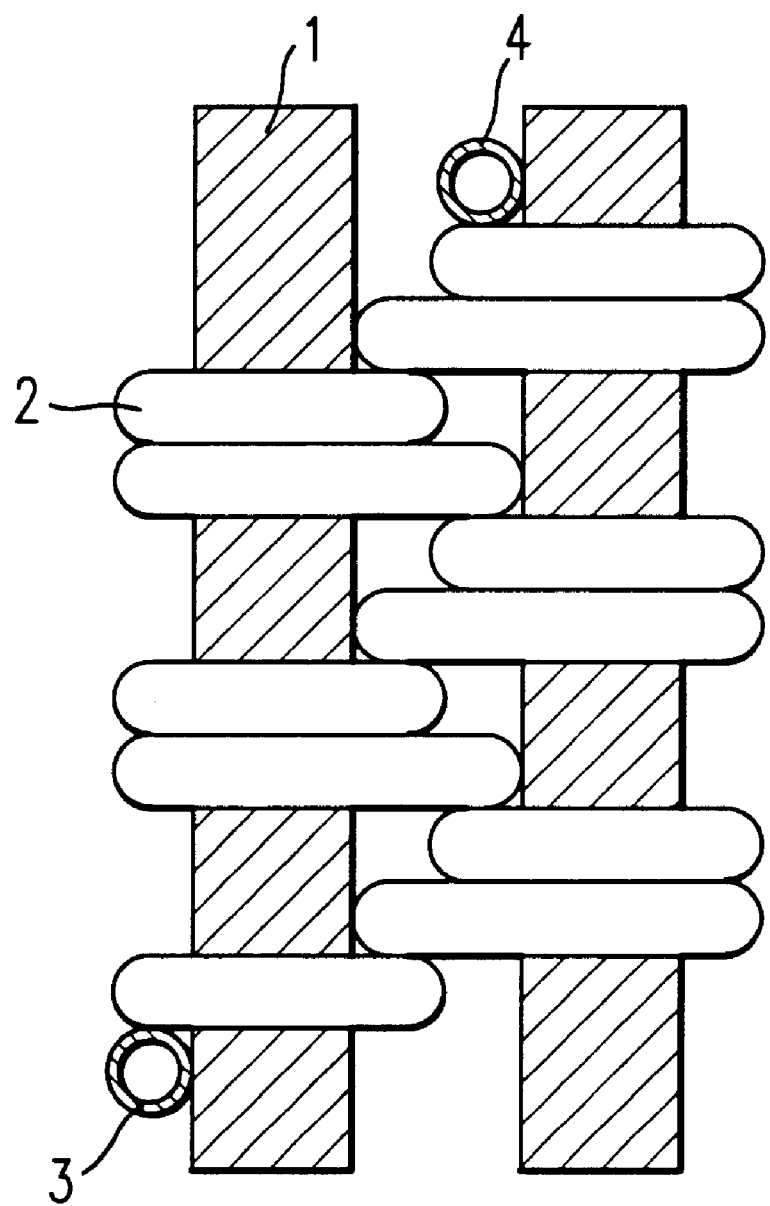
FIG. 9 shows the side view of a reactor according to the invention in the form of a winding, modified with respect to FIG. 5, around two rods
Figure 10:
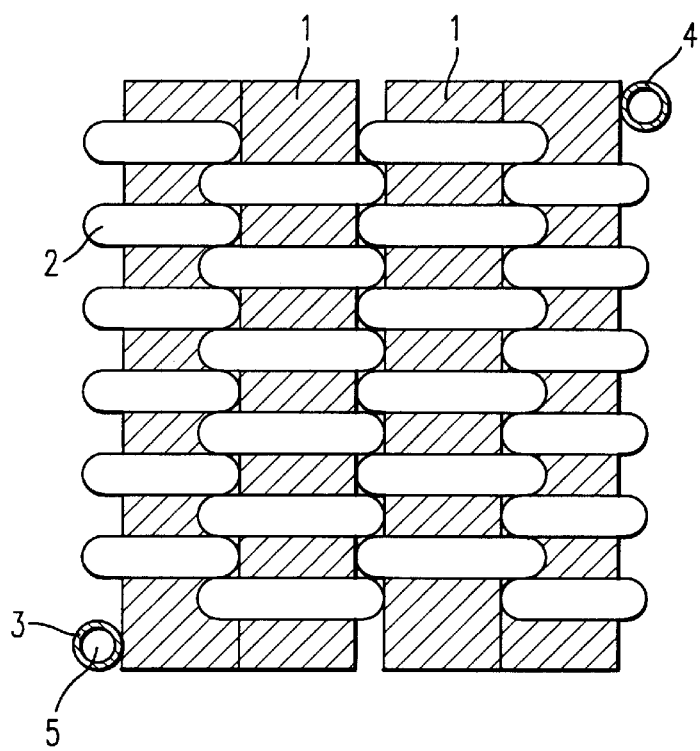
FIG. 10 shows a schematic part view of a reactor according to the invention in the form of a winding around 7 rods arranged at the corners of an equilateral polygon

The center of gravity of the cross-sectional area of the tube is shown by 5 in FIG. 10. The distance which the center of gravity of the cross-sectional area of the tube has traversed from the start of a bend to the change in the direction of curvature is the distance the center of gravity of the cross-sectional area of the tube traverses between 6 and 7 in FIG. 11.

EXAMPLE 1

Figure 11:
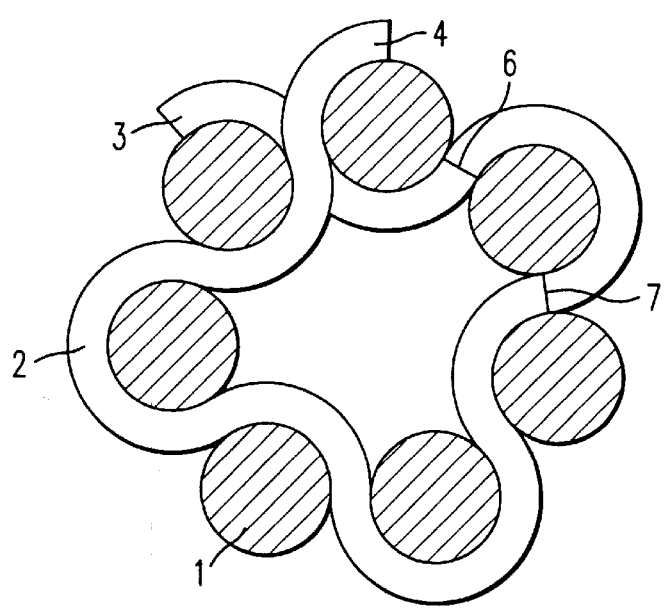
FIG. 11 shows a schematic plan view of a winding loop according to FIG. 10
Figure 12:
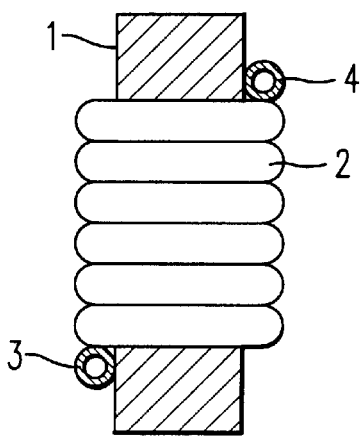
FIG. 12 shows a side view of a helical winding according to the prior art
Figure 13:
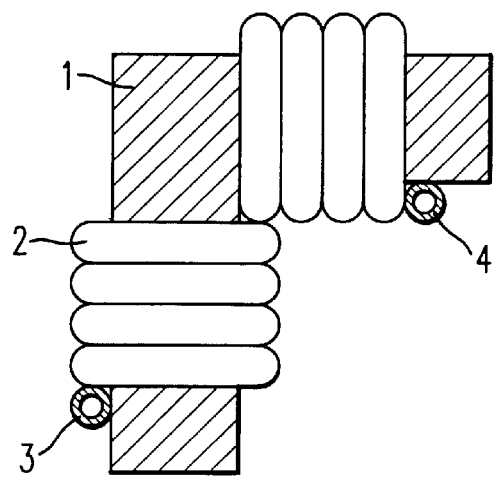
FIG. 13 shows a side view of a helical winding with a 90° kink according to the prior art
Figure 14:
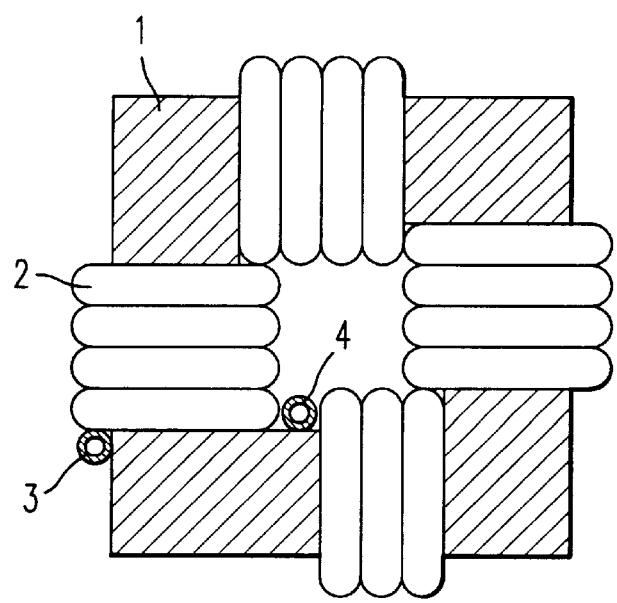
FIG. 14 shows a side view of a helical winding with four 90° kinks according to the prior art

Tubular reactors comprising the winding configurations shown in FIGS. 5 and 9 to 14 were fabricated, FIGS. 12 to 14 representing the prior art as described at the outset. The FIGS. 13 and 14 correspond to the arrangement described by Saxena in AEChE Journal Vol. 30, 1984, pp. 363–368, a PVC fabric hose having a length of 50 m, an internal diameter of about 1 cm and a wall thickness of 3 mm being used for this purpose. The tubular reactor was wound, in the manner shown in said figures, around supporting pipes having an external diameter of 10.5 cm and 7.5 cm, respectively. The tubular reactor therefore had a radius of curvature of about 6.05 cm and 4.55 cm, respectively.

Using these reactors, the residence time density curves were determined by deionized water being tagged intermittently, using NaCl solution as a tracer and by the change of the concentration with time being measured with the aid of conductivity measuring cells at the reactor inlet and outlet. The signals were recorded with the aid of an AD converter card, by means of a personal computer.

Figure 15:
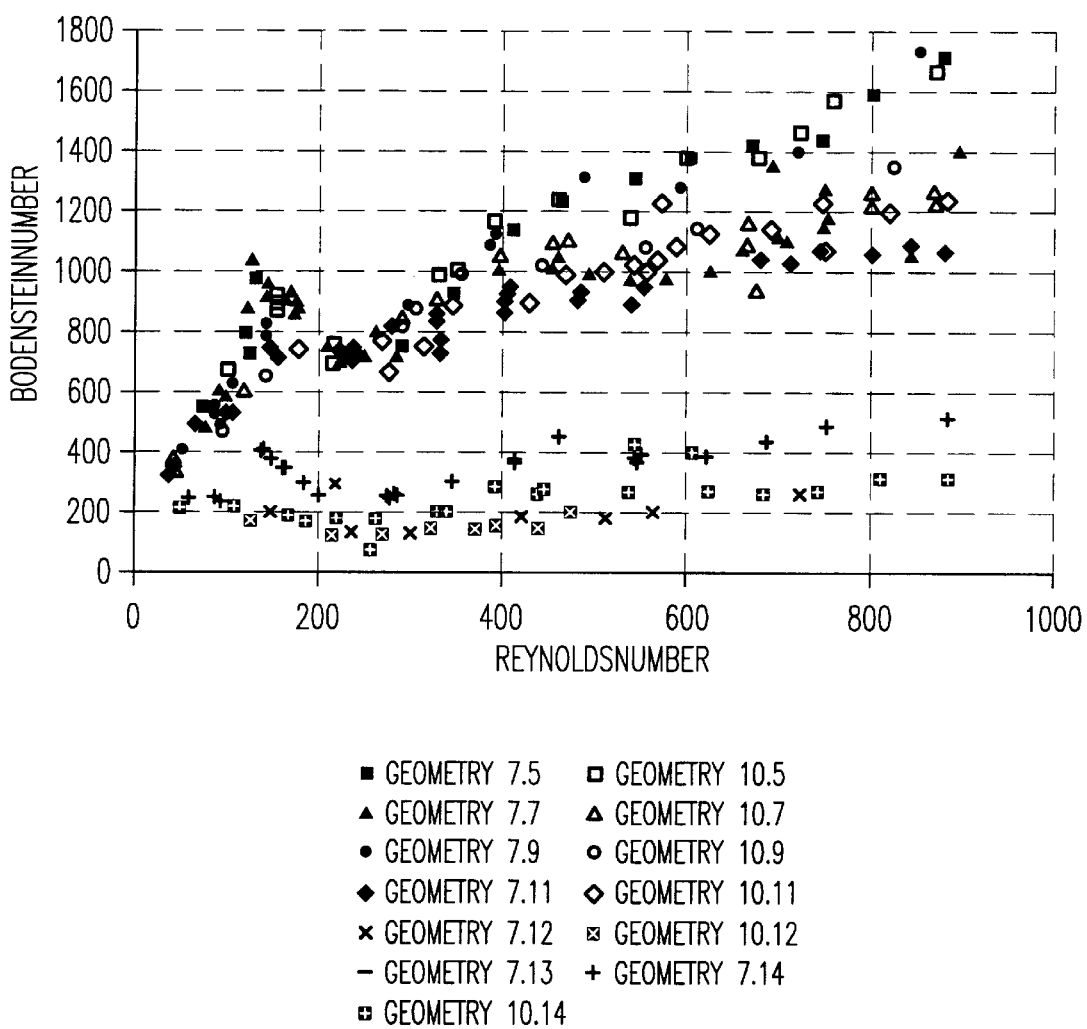
FIG. 15 shows a graph in which the Bodenstein number, determined experimentally, according to the prior art, on an apparatus according to the invention, is plotted against the Reynolds number
Figure 16:
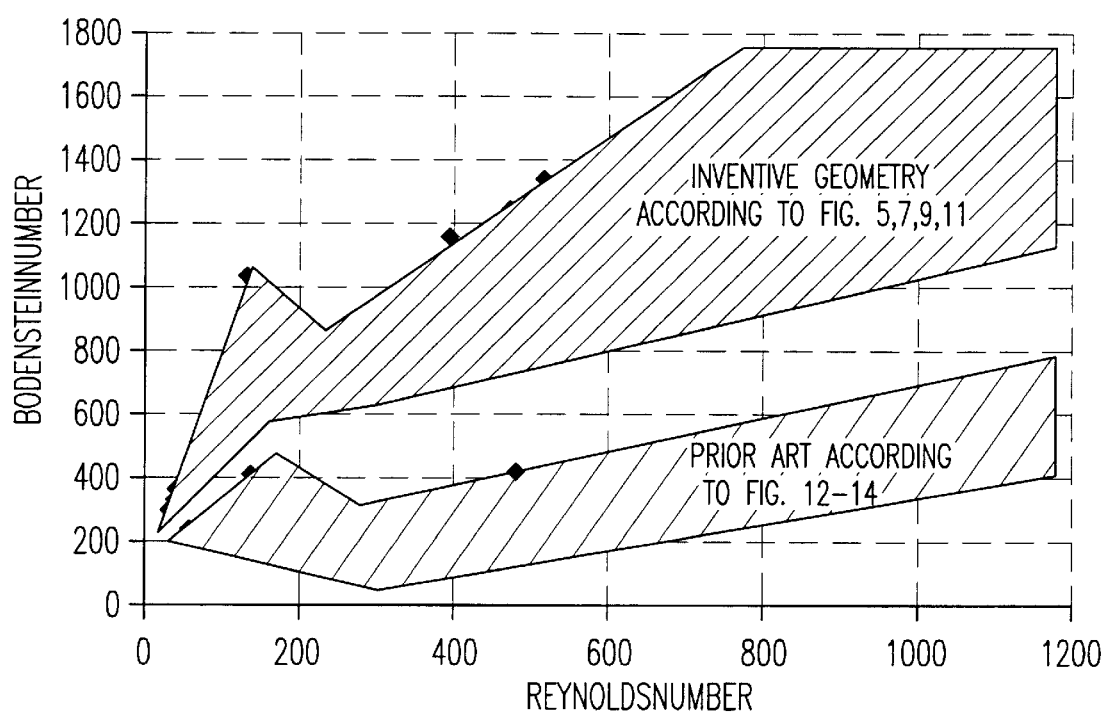
FIG. 16 shows a clearer view of FIG. 15 by means of hatching of the ranges of the experimental results.

From the residence time density curves thus obtained it is possible to determine the characteristic parameters of the curves by fitting a model such as the dispersion model (Chemical Reaction Engineering, Octav Levenspiel, Wiley & Sons, 1972). In the case of the dispersion model a dimensionless characteristic, the dispersion number, is obtained as is the mean residence time. The inverse of the dispersion number is referred to as the Bodenstein number, which specifies the ratio of convective and conductive mass transfer. To allow a comparison between the various tubular reactors, the Bodenstein number was plotted against the Reynolds number (characteristic). The results are shown graphically in FIGS. 15 and 16. The assignment of the experimental results should be understood as follows: The internal diameter of the support pipe, in cm, forms the prefix, separated from which by a point is the number of the figure which corresponded to the winding. For example, 7.12 therefore means: support pipe internal diameter 7 cm, winding according to FIG. 12.

The results show that, surprisingly, a distinctly higher Bodenstein number is achieved with the aid of the reactor according to the invention than with the reactors according to the prior art (FIGS. 12 to 14).

EXAMPLE 2

The behavior of the novel apparatus for media having higher viscosities is shown in the next example. A PVC fabric hose having a length of 50 m, an internal diameter of about 5 cm and a wall thickness of about 5 mm was wound, in the winding configuration shown in FIG. 11, around supporting pipes having an external diameter of 16 cm. The tubular reactor therefore had a diameter of curvature of about 22 cm. The radius of the locus of the centers of the supporting pipes was 28 cm. Using this reactor, residence time distributions were carried out by solutions of water and polyethylene glycol being tagged intermittently with identical solutions which additionally contained KCl. The measurement of the change of the correlation over time and the analysis of said change was carried out in a manner similar to that mentioned in Example 1. The results are shown in the table.

| Viscosities $m^2 s^{-1}$ | | | | | | | | | |
|---|---|---|---|---|---|---|---|---|---|
| $1.00 \cdot 10^{-6}$ | | $2.25 \cdot 10^{-6}$ | | $5.30 \cdot 10^{-6}$ | | $9.50 \cdot 10^{-6}$ | | $1.77 \cdot 10^{-6}$ | |
| Re | Bo | Re | Bo | Re | Bo | Re | Bo | Re | Bo |
| 1575 | 576 | 723 | 383 | 438 | 341 | 219 | 226 | 126 | 150 |
| 1589 | 607 | 817 | 395 | 365 | 319 | 176 | 153 | 111 | 109 |

-continued

| Viscosities m²s⁻¹ | | | | | | | | | |
|---|---|---|---|---|---|---|---|---|---|
| $1.00 \cdot 10^{-6}$ | | $2.25 \cdot 10^{-6}$ | | $5.30 \cdot 10^{-6}$ | | $9.50 \cdot 10^{-6}$ | | $1.77 \cdot 10^{-6}$ | |
| Re | Bo | Re | Bo | Re | Bo | Re | Bo | Re | Bo |
| 1817 | 619 | 944 | 434 | 229 | 219 | 160 | 128 | 97 | 73 |
| 717 | 424 |  |  | 307 | 252 | 130 | 104 | 87 | 50 |
| 1002 | 513 |  |  | 234 | 224 | 252 | 250 | 82 | 50 |
| 1226 | 523 |  |  | 223 | 224 |  |  | 76 | 46 |
| 1441 | 583 |  |  |  |  |  |  | 62 | 42 |
| 1570 | 613 |  |  |  |  |  |  | 61 | 32 |
| 1740 | 684 |  |  |  |  |  |  |  |  |
| 1981 | 719 |  |  |  |  |  |  |  |  |
| 2172 | 778 |  |  |  |  |  |  |  |  |
| 2201 | 811 |  |  |  |  |  |  |  |  |
| 2495 | 885 |  |  |  |  |  |  |  |  |
| 2941 | 1021 |  |  |  |  |  |  |  |  |

Re = Reynolds number
Bo = Bodenstein number

EXAMPLE 3

A cross-linking reaction was carried out in a tubular reactor according to the invention. The reactor consisted of a PVC fabric hose having a length of 100 m, an internal diameter of 10 mm and an external diameter of 16 mm. The hose was wound, rising steadily, around a structure consisting of seven core tubes in the form of an equilateral heptangle, each having an external diameter of 75 mm, as shown in FIG. 11. The centers of the core tubes were disposed on a circle having a radius of 150 mm.

In order to carry out the reaction, a solution (1) consisting of 4 parts of polyvinyl alcohol, 96.16 parts of water and 0.16 parts of glutaric dialdehyde was pumped into the reactor from a supply tank at room temperature. 26% strength nitric acid (2) was metered in with a separate pump, which was disposed directly in front of the reactor, and mixed in with the help of a static mixer. The static mixer consisted of a glass tube having a length of 200 mm and a diameter of 10 mm, charged with 4 mm glass Raschig rings. The ratio of volume flows was 169:1. The flow velocity was determined at the reactor outlet and was (255+/−10) ml/min. In order to measure the velocity at the reactor outlet, samples were taken and adjusted to pH 10 with 4 molar sodium hydroxide solution and the reaction was thus terminated. The viscosity of the outlet samples was (35+/−5) mm²/s. The viscosity of the polyvinyl alcohol solution (1) was 12 mm²/s.

Figure 17:
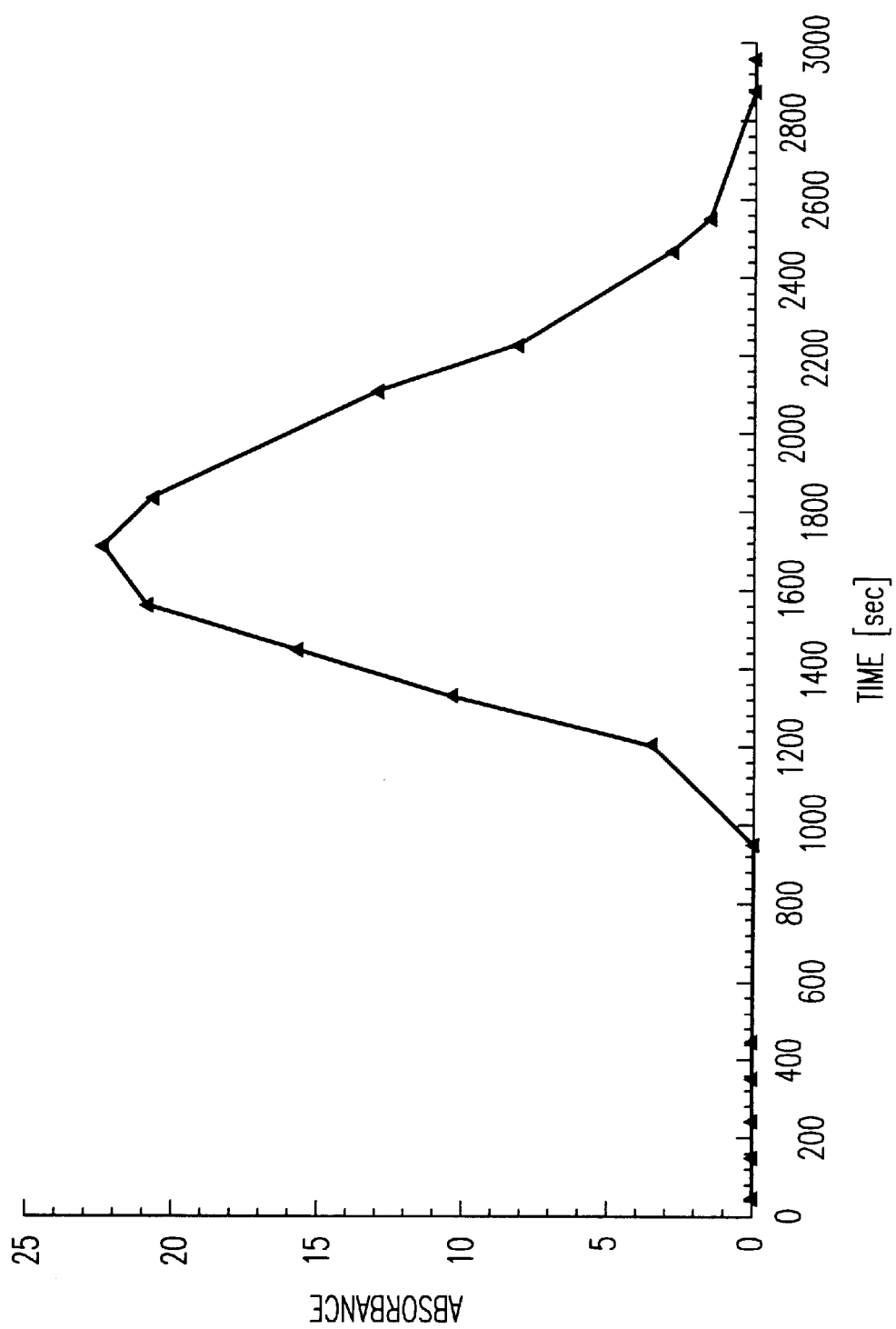
FIG. 17 shows a graph of the residence time distribution in the experiment according to example 3 in the tubular reactor according to the invention.

In order to determine the residence time distribution, 5 ml of 2 molar potassium thiocyanate solution were injected at once during the cross-linking reaction through a septum. The input signal was received by a conductivity measuring cell and stored in a data acquisition device. Samples having a volume of about 40 ml were taken at the reactor outlet and not quenched. The samples were stored for at least 10 hours, after which time the polymer had reacted to form a gel. Then 5 ml of polymer-free solution were taken from the sample. 1 ml of 0.25 molar iron(III)chlorid solution was added and a measurement was made using a spectrometer at a wavelength of 400 nm. The residence time density curve was derived from the magnitude of this signal (FIG. 17). The input and output signals were evaluated analogously to the previous example on the basis of the dispersion model. The Bodenstein number was determined to be 59.

During the entire experimental period of 3.5 hours, i.e. about seven average residence times of about 1800 s, the reactor was operated without any problem. The desired cross-linking was carried out as planned. No gelling inside the reactor or formation of gel lumps at the reactor outlet was observed.

In a comparative experiment, solution (1) was introduced as the initial charge in a stirred vessel for batchwise operation, the torque of the stirrer being measured in order to observe the viscosity, and solution (2) was added batchwise in an amount analogous to the previous example. The polymerisation lead first to a slow, then to a very steep, increase in viscosity, as is evident from the course of the torque in FIG. 18. Once this point has been reached in a reactor, this will lead to the formation of gel particles and possibly to the reactor being clogged up completely.

Figure 18:
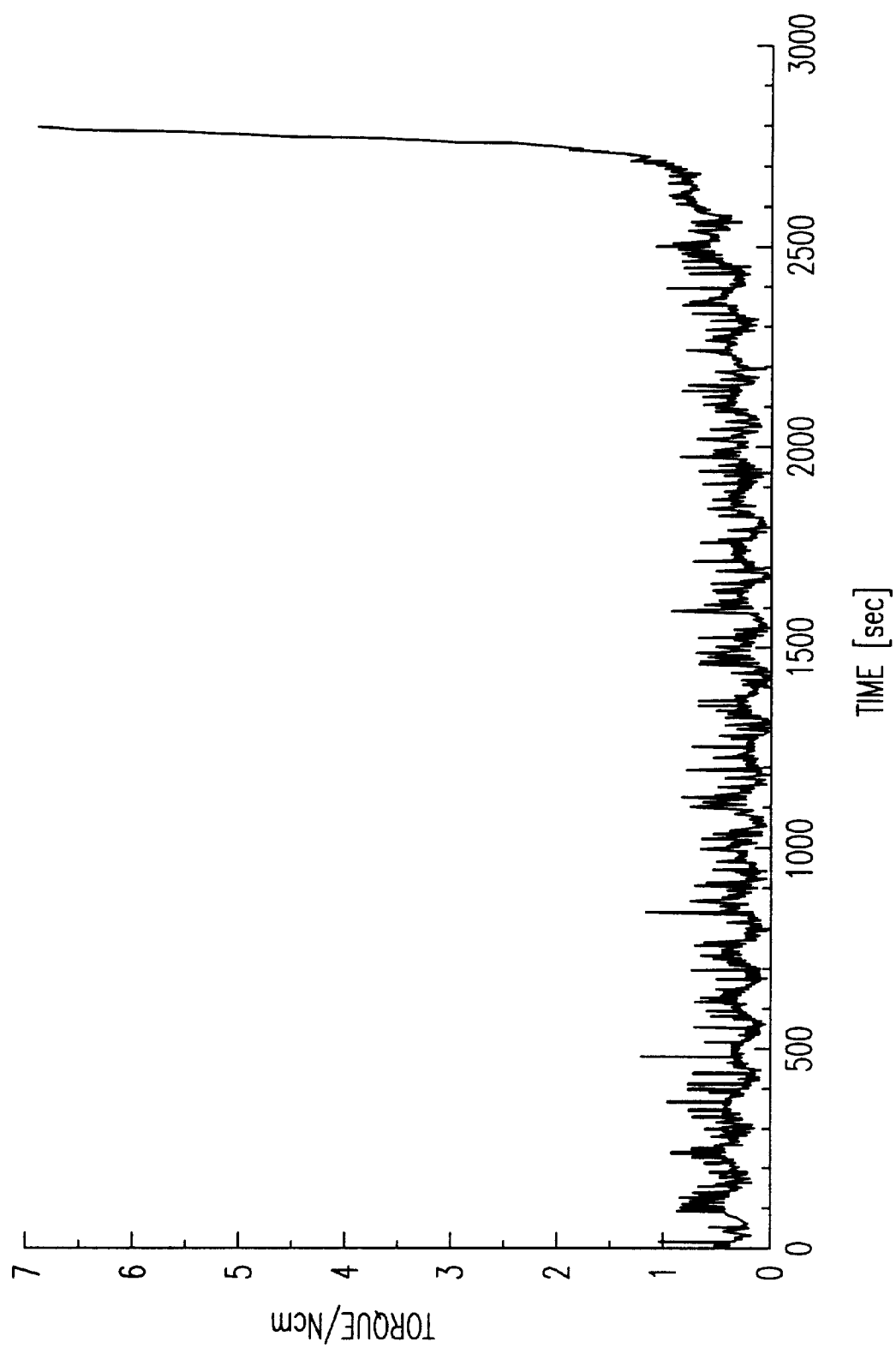
FIG. 18 shows a graph of the torque (as a function of time) at the stirrer used in the comparative experiment according to example 3.

A comparison of FIG. 17 and FIG. 18 shows that the long, trouble-free operating time of the tubular reactor results from the hydrodynamics and, thus, from the geometry of the reactor.

Additionally, the following particular features of the curved tubular flow reactor of the present invention are noted.

Preferably, in the present reactor, a reversal in the direction of curvature takes place at the latest when the distance which the center of gravity of the cross-sectional area of the tube has traversed from the start of a bend is 100 times, in particular 70 times, preferably 50 times the diameter of tube.

Also preferably, a reversal in the direction of curvature takes place when the distance which the center of gravity of the cross-sectional area of the tube has traversed from the start of the bend is in the range of from 10 to 200 times, from 10 to 100 times, in particular from 10 to 70 times, preferably from 10 to 50 times and especially preferably from 10 to 50 times and especially preferably from 10 to 30 times the diameter of the tube.

Moreover, it is further preferred that the radius of curvature be from 0.5 to 100 times, in particular from 1 to 80 times, the diameter of the cross-sectional area of the tube.

In the present reactor, it is preferred, for an elliptical cross section, that a ratio of semimajor axis to semiminor axis be in a range of from 5:1 to 1:1.

Further, it is preferred that in the present reactor the pitch of the winding be from 2 to 10 times the diameter of the tube (where the tube cross section is circular) or the arbor pointing in the direction of the pitch (where the cross-section of the tube is elliptical).

Additionally, it is generally preferred that the spacing between the tubes or rods be from 1 to 3 times the reactor diameter.

Generally, the reactor is made of metal, metal alloy, glass or plastic and preferably of copper steel, alloy steel, fluorine-containing plastic, polyethylene, polypropylene or poly(vinyl chloride). More preferably, the reactor has an inside coating or has been treated inside.

The reactor is generally fabricated from special section tubes, in particular, swirl promoter tubes or fluted tubes, and is provided with means for introducing or feeding chemicals thereinto.

Generally, the reactor is also provided with pulsation means, means for feeding in bubbles of inert gas, measuring points for sampling and cleaning, and means for cooling or heating the tube contents.

The reactor of the present invention is generally used for carrying out chemical reactions in the liquid phase, for preparing mixtures and as a heat exchanger.

We claim:

1. A curved tubular flow reactor, comprising at least one tube having an essentially circular or elliptical cross section, which tube comprises a plurality of curved sections having alternating directions of curvature, and, optionally, one or more straight sections, wherein the distance from the start of a curved section to a change in direction of curvature, as measured along the center of gravity of the cross-sectional area of said tube, is no greater than 70 times the diameter of the tube, and wherein the ratio of the lengths of straight sections to curved sections of said tube is ≦5.

2. The reactor of claim 1, wherein at least one of said curved sections comprises up to three circumvolutions around an axis of curvature.

3. The reactor of claim 1, wherein said curved sections having alternating directions of curvature form essentially sinusoidal bends.

4. The reactor of claim 3, wherein the ratio of amplitude to period/4 of the sinusoidal bends is 1:2 to 1:20.

5. The reactor as claimed in claim 1, wherein the shape of the curved sections is a semicircle.

6. The reactor of claim 1, wherein the tube winds around at least 2 essentially parallel arbors.

7. The reactor of claim 6, wherein the tube winds around a plurality of essentially parallel arbors arranged in one plane.

8. The reactor of claim 6, wherein the tube winds around essentially parallel arbors running perpendicularly through the corners of an essentially equilateral polygon, said polygon having n corners, n being an odd number ≧3.

9. The reactor of claim 1, wherein said distance is 50 times the diameter of the tube.

10. The reactor of claim 1, wherein the distance is in the range of from 10 to 70 times the diameter the tube.

11. The reactor of claim 1, wherein the distance range of from 10 to 50 times the diameter the tube.

12. The reactor of claim 1, wherein the distance is in the range of from 10 to 30 times the diameter of the tube.

13. The reactor of claim 1, wherein a radius of curvature of at least one of the curved sections is from 0.5 to 100 times the diameter of the cross-sectional area of the tube.

14. The reactor of claim 13, wherein the radius of curvature is from 1 to 80 times the diameter of the cross-sectional area of the tube.

15. The reactor of claim 1, wherein when the tube has an elliptical cross section, the ratio of semimajor axis to semiminor axis in said elliptical cross section is in the range of from 5:1 to 1:1.

16. The reactor of claim 1, wherein the ratio of length to diameter of the tube is in the range of from 100:1 to 1,000,000:1.

17. The reactor of claim 6, wherein a pitch of the winding is from 2 to 10 times the diameter of the tube where the cross section of the tube is circular or the arbors point in a direction of pitch where the cross section of the tube is elliptical.

18. The reactor of claim 6, wherein the arbors are formed by tubes or rods (1).

19. The reactor of claim 18, wherein an external spacing between the tubes or rods is from 1 to 3 times the diameter of the tube.

20. The reactor of claim 1, wherein the tube is made of metal, metal alloy, glass or plastic.

21. The reactor of claim 20, wherein the tube is made of copper, steel or alloy steel.

22. The reactor of claim 20, wherein the tube is made of fluorine-containing plastic, polyethylene, polypropylene or poly(vinyl chloride).

23. The reactor of claim 20, wherein the tube is coated or treated on the inside thereof.

24. The reactor of claim 20, wherein the tube is comprised of fluted tubes or swirl promoter tubes.

25. The reactor of claim 1, which further comprises a means for introducing bubbles of inert gas into said tube.

26. The reactor of claim 1, which further comprises a device for heating or cooling a content of the tube.

27. The reactor of claim 1, wherein the tube has the form of an essentially self-supporting winding.

28. The reactor of claim 6, wherein said winding is self supporting.

29. A method of carrying out chemical reactions in liquid phase, of preparing mixtures or of carrying out heat exchange, which comprises:

a) adding reactants, components of a mixture to be mixed, or a substance to or from which heat is to be exchanged to the reactor of claim 1; and b) carrying out chemical reaction of said reactants, mixing said components of said mixture, and exchanging heat to or from said substance.

30. A process for carrying out chemical reactions in a liquid phase or for preparing mixtures or for exchanging heat comprising carrying out said chemical reactions or preparing mixtures or exchanging heat in the reactor of claim 1.

31. A process for continuous liquid-phase polymerization, of at least one ethylenically unsaturated monomer, which comprises carrying out said process in the reactor of claim 1.

32. The process of claim 31, which involves a flow which is characterized by a Reynolds number in the range of from 1 to 10,000.

33. The process of claim 31, further comprising adding one or more comonomers at a point along the reactor to prepare a copolymer.

34. The process of claim 31, wherein at least one monomer is used which is selected from among mono- or diolefins, $C_3$–$C_{16}$-monoethylenically unsaturated mono- or dicarboxylic acids or mono- or diesters thereof with $C_1$–$C_{18}$-alkanols or -diols or amides and N-mono- or N,N-di-$C_1$–$C_{18}$-alkylamides thereof, (meth)acrylonitrile, vinylaromatic compounds, vinyl-$C_1$–$C_{18}$-alkylethers, vinyl-$C_1$–$C_{18}$-alkylesters, N-vinyllactams and vinyl halides.

35. The process as claimed in claim 34, wherein the monomer is selected from among ethylene, propylene, butadiene, acrylic acid, methacrylic acid, $C_1$–$C_{12}$-alkyl (meth)acrylates, acrylamide, methacrylamide, acrylonitrile, methacrylonitrile, styrene, α-methylstyrene, vinyl ethyl ether, vinyl acetate, vinyl propionate, N-vinylpyrrolidone and vinyl chloride.

36. The process of claim 31, wherein a polymerization temperature in the range of from 5 to 250° C. is employed.

37. The process of claim 31, wherein the polymerization is carried out in an aqueous or organic medium.

* * * * *